United States Patent [19]

De Freitas et al.

[11] 4,027,101

[45] May 31, 1977

[54] SIMULATION OF REVERBERATION IN AUDIO SIGNALS

[75] Inventors: Richard E. De Freitas, Westford; Peter W. Mitchell, Charlestown; Peter D. Tribeman, Sharon; Samuel Wilensky, Concord, all of Mass.

[73] Assignee: Hybrid Systems Corporation, Bedford, Mass.

[22] Filed: Apr. 26, 1976

[21] Appl. No.: 680,473

[52] U.S. Cl. .............................. 179/1 GQ; 179/1 J; 179/1 G; 84/DIG. 26

[51] Int. Cl.[2] .......................................... H04R 5/00

[58] Field of Search ............. 179/1 GQ, 1 G, 1 GP, 179/1 J, 100.1 TD, 100.4 ST; 84/DIG. 26, 1.24

[56] References Cited

UNITED STATES PATENTS

| | | | |
|---|---|---|---|
| 3,094,587 | 6/1963 | Dow | 179/1 G |
| 3,217,080 | 11/1965 | Clark | 84/1.24 |
| 3,249,696 | 5/1966 | Van Sickle | 179/1 G |
| 3,281,533 | 10/1966 | Pflager | 179/1 G |
| 3,710,023 | 1/1973 | Greuzard et al. | 179/1 G |
| 3,939,436 | 2/1976 | Keller | 84/DIG. 26 |

*Primary Examiner*—Douglas W. Olms
*Attorney, Agent, or Firm*—Weingarten, Maxham & Schurgin

[57] ABSTRACT

An audio system which achieves a concert hall reverberation effect from a stereo input signal. From two stereo input signals the audio system produces quadraphonic signals suitable for application to four speakers in the pattern of a quadraphonic sound reproduction system. The system applies the stereo input signals to a front pair of speakers substantially without alteration while reverberation is added to the stereo input signals for application to the rear speakers which realistically reproduces the impression of concert hall acoustics in the sound reaching the listener from all four speakers. The reverberation is provided by a channel signal delay scheme in combination with a channel interconnection network which achieves long reverberation times with a high echo density that eliminates objectionable, discrete echo effects.

2 Claims, 9 Drawing Figures

SIMULATION OF REVERBERATION IN AUDIO SIGNALS

FIELD OF THE INVENTION

This invention relates to audio systems for providing quadraphonic sound reproduction from stereo input signals, and more specifically to a system for introducing reverberation into the quadraphonic reproduction to realistically simulate large room acoustics.

BACKGROUND OF THE INVENTION

Electronic devices are in use today to add reverberation to signals used in sound reproduction. Such artificial reverberation units are intended to act on these sound signals to achieve the echo or reverberation effect of large rooms or concert halls. In a system designed for home high-fidelity sound reproduction equipment, this realistic reproduction of reverberation must be achieved at a moderate cost in order for such a system to be economically feasible. Several reverberation systems are available for use in high-fidelity systems, but these systems suffer from a lack of realism and a characteristic artificiality in the final sound which has come to be commonly associated with reverberation systems or employ, for example, reverberation chambers and plates which are not practical for use in home high-fidelity systems because of their size and expense.

Several features of a concert hall must be provided for in a reverberation system if the final sound output is to realistically simulate the sound heard in a concert hall or other performance room. An important such feature required in a reverberation system is reverberation time, defined as the time for the sound intensity to decay by 60 dB. While the ideal reverberation time varies, depending on the particular sound being reproduced, a typical range for reverberation times might be from 0.5 to 2.0 seconds.

Another very important reverberation feature is the interval between reflections. While a concrete tunnel may have a reverberation time equal to a concert hall, there is a very distinct difference between sounds reproduced in each. In concert halls with good acoustics, sound reflections follow many different paths having many different intervals between each of the reflections or echoes. The result is that the reflections effectively occur at a large number of random times producing a high density of echoes, such that individual reflections cannot be discerned by the human ear.

In order for a system to provide realistic reverberation in an input signal, it must simulate very closely the response of an actual concert hall with respect to each of the parameters mentioned above.

Beside reverberation, another factor important in sound reproduction systems is the illusion of directionality in the reproduced sound. It is well known that a stereo sound reproduction system reproduces sound much more realistically than a single channel system due to the apparent directionality of the reproduced sound. Recently, quadraphonic sound systems having four separate sources of reproduced sound have been gaining increasing acceptance because of their further improvements in directionality. However, much of the recorded material available today has only two signal channels. Because of this, there is a demand for systems which can provide signals for driving quadraphonic speakers from a single stereo input signal pair.

SUMMARY OF THE INVENTION

According to the teaching of the present invention, a system is described for introducing a realistic reverberation into a single stereo input signal pair and for deriving therefrom a set of four outputs for application to loudspeakers in a quadraphonic sound reproduction format. In implementing the invention, two reverberation units having different reverberation periods are provided in a cross coupled arrangement wherein the output of each unit is applied at the input of the other unit. The two signals of the stereo signal pair to be processed are applied as further inputs to the respective reverberation units in combination with the output from the the opposite reverberation unit. The outputs of each reverberation unit may then be used alone or in certain combinations for driving separate rear channel speakers of a quadraphonic set. Some of the original stereo signals may also be injected into the rear speaker signals if desired. For driving the front two speakers of a quadraphonic set of speakers, the stereo inputs may be used directly or in combination with some of the reverberating signals.

The echoes of each reverberation unit when applied to the other reverberation unit will be augmented with other echoes. The intervals between these echoes will be different for each reverberation unit. Since the output from each reverberation unit is added to the input to the other reverberation unit, these two sets of echoes having different reverberation periods intermix. This results in outputs from each of the reverberation units which realistically simulate the reverberation typically observed in an actual room or concert hall.

DESCRIPTION OF THE DRAWINGS

These and other features of the present invention are more fully set forth below in the solely illustrative detailed description of the preferred embodiment and accompanying drawing of which.

DETAILED DESCRIPTION OF THE INVENTION

Figure 1:
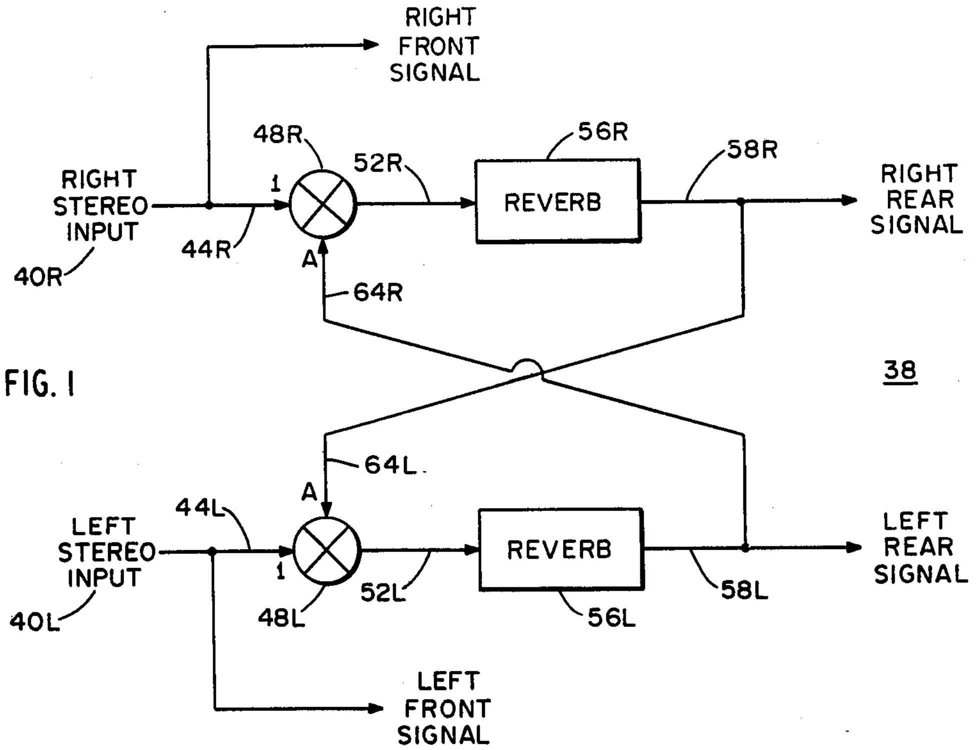
FIG. 1 is a block diagram of a system for achieving the features of the present invention.

The present invention contemplates a reverberation system for creating the illusion of concert hall acoustics in an audio signal, typically a stereo signal. The illusion is achieved by imparting reverberation to the audio signal and by developing a quadraphonic output from the stereo input. With reference to FIG. 1, there is shown in block diagram an implementation of this concept for use with a stereo input having separate left and right input signals on lines 40R and 40L. As shown, these left and right stereo input signals are applied to first inputs 44R and 44L, having unity gain, of mixers 48R and 48L. The outputs 52R and 52L of these mixers are applied to corresponding reverberation units 56R and 56L, each of different characteristics as explained below. The outputs of reverberation units 56R and 56L are cross-coupled back to second inputs 64L and 64R of opposite mixers 48L and 48R, respectively. The gain of mixer inputs 64R and 64L denoted as A, is less than one to provide for stability in the closed loop paths. Normally, when being used in a four-channel system, signals for driving right-front and left-front speakers would be taken directly from the right and left stereo input signals to mixers 48R and 48L. Signals used to drive right-rear and left-rear speakers may be suitably taken at the output of each of the reverberation units 56R and 56L as shown in FIG. 2, or after further processing, as shown below.

Figure 2:
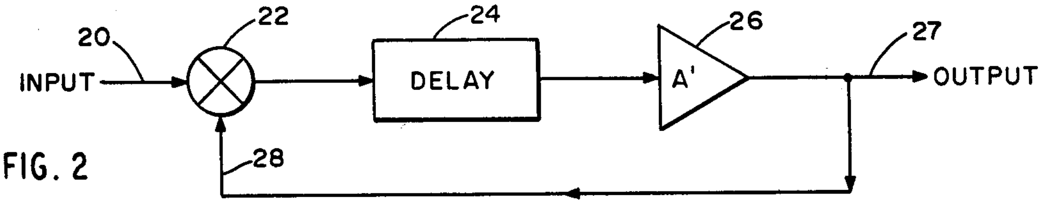
FIG. 2 is a diagram of a reverberation unit suitable for use with the invention of FIG. 1.

FIG. 2 shows one possible implementation of the reverberation units 56R and 56L. Within the reverberation units an input signal is applied to an input 20 of a mixer 22. This signal is applied to the input of a delay line 24. Delay line 24 may be implemented in several different ways well known to those in the art, the primary requirement being that an analog signal applied to the input of the delay line is faithfully reproduced at the output of the delay line a specified time later. One method particularly suitable for use with the invention is the delay line described in a copending application of Richard DeFreitas for MULTIPLE STATE RESPONSIVE DELTA-SIGMA CONVERTER AND DELAY LINE, Ser. No. 667,146, filed Mar. 15, 1976. Another method would be to use the delay between recording and reproduction heads in a multi-head tape recording system. The length of time that a signal is delayed by delay line 24 will be denoted by T, the reverberation period. The output from delay line 24 is applied to amplifier 26 which has a gain, denoted by A′, less than unity. The output 27 of the reverberation unit is taken from the output amplifier 26. This output is also connected to the second input 28 of mixer 22.

Figure 2A:
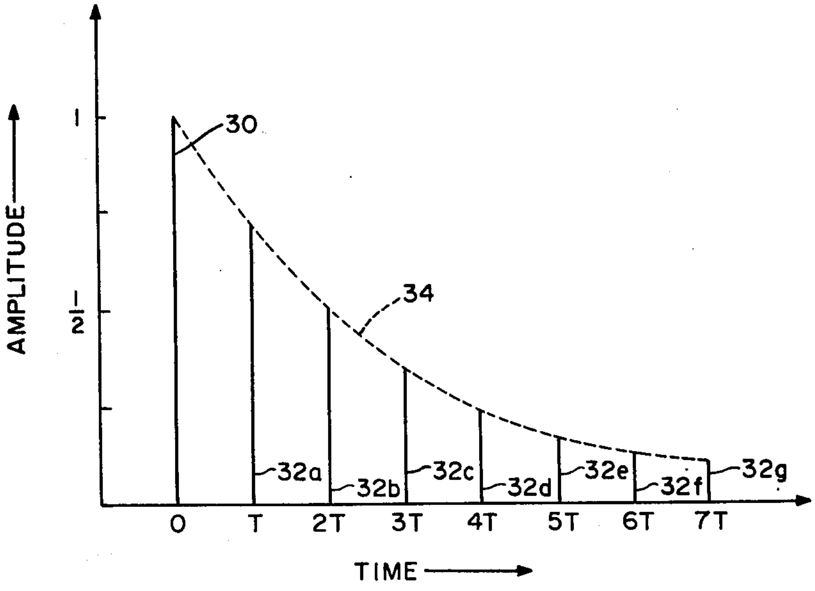
FIG. 2A is a graph useful in explaining the operation of the invention.

The operation of the reverberation unit 18 is such that an input signal applied to the input 20 of the reverberation unit reappears periodically at the output 27 of the reverberation unit with an amplitude which decreases with time. FIG. 2A shows the output of the reverberation unit of FIG. 2 in response to an input pulse 30. At time T, the input is reproduced at the output 27 of the reverberation unit as an output pulse 32*a*, but decreased in amplitude by a factor governed by A′, the gain of amplifier 26. At time 2T, a further pulse 32*b* appears at the output, again reduced in amplitude. The time between these "echoes" is equal to the delay time and is referred to as the reverberation period. This process continues with the amplitudes of the output pulses 32*a*, *b* . . . decreasing asymtotically as shown by line 34.

Reverberation time as distinct from the reverberation period, described above, is defined as the length of time for the output to reach a set percentage of the input to the reverberation unit and is dependent upon both the reverberation period, T, and the gain A′ of the amplifier 26. It is generally desired to provide a reverberation time of significant length in such a reverberation unit.

In order to assure that the delay line 24 is stable in operation, the loop gain, the gain around the loop from mixer 22 to delay line 24 to amplifier 26 and back to mixer 22, must be less than one. In practice, it becomes more difficult to maintain the desired closed loop characteristics when the loop gain approaches unity. A typical operating level for the loop gain, in this case the gain A′ of amplifier 26, is approximately 0.7. This provides a relatively large attenuation between pulses which will shorten the reverberation time.

The reverberation time may be lengthened by lengthening the other variable which affects it, the reverberation period, T. A long interval of time between echoes, however, is easily detected by the ear, and it produces very undesirable results when used in an audio reproduction system.

In order to create a reverberation system having a relatively long reverberation time without having an undesirably long time between discrete echoes, several different reverberation units of the type shown in FIG. 2 each having a different reverberation period can be connected in series or in parallel. The result of such a connection is that the reverberation period of the reverberation units can all be long enough to allow a relatively long reverberation time to be realized, but since the reverberation periods are all slightly different from each other, several echoes occur in the time period where only one echo occurred before, thus effectively eliminating the discrete echo effect. In fact, the echo response which results from such a connection is somewhat random and resembles closely that of real rooms. A drawback to this type of reverberation system is that many different reverberation units of the type shown in FIG. 1 are required, and in a stereo or quadraphonic system, this number of required units is multiplied by 2 or 4. Thus, the cost of such a system tends to be quite high.

The reverberation circuit shown in FIG. 1 achieves the result of a long reverberation time without the acoustically undesirable problem of discrete echoes, and with a minimum number of components by employing different delays or reverberation times in the reverberation units 56L and 56R. Thus, the system is much more economically feasible than prior reverberation systems capable of achieving long reverberation times. Furthermore, the system can be used with two discrete input signal sources, such as right and left stereo signals, to provide two additional signals which may be used to synthesize, for example, the rear speaker signals in a quadraphonic system.

Figure 3A:
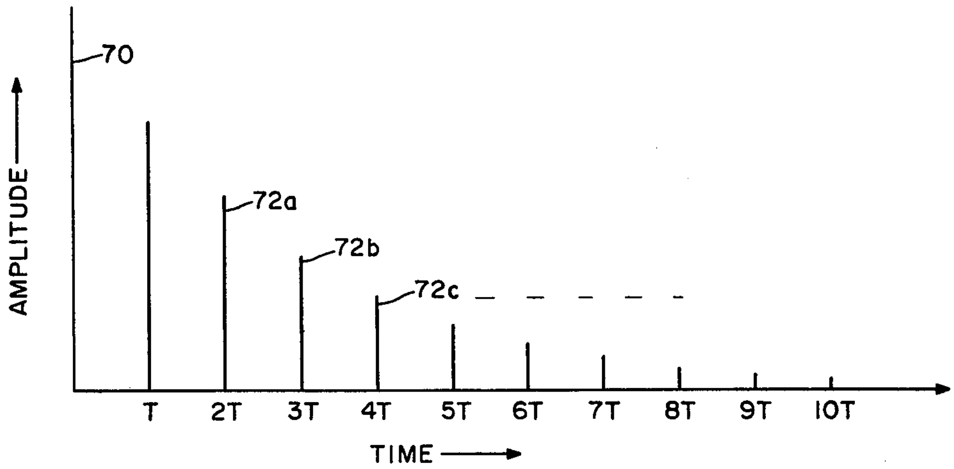
FIGS. 3A, 3B and 3C are graphs showing signals useful in explaining the operation of the invention.
Figure 3B:
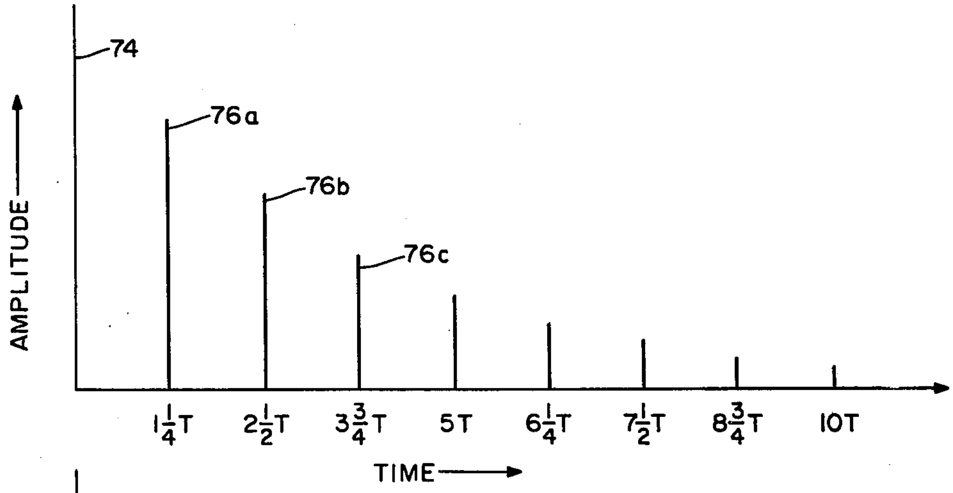

The operation of the circuit shown in FIG. 1 is best explained by referring to FIGS. 3A, B, C. FIG. 3A shows the response of reverberation unit 56R to an input pulse 70 as a series of output pulses 72*a*, *b* . . . with a reverberation period of T. FIG. 3B shows the response of reverberation unit 56L to an input pulse 74 as a series of pulses 76*a*, *b* . . . with a larger reverberation period of, for example, 1.25T.

Figure 3C:
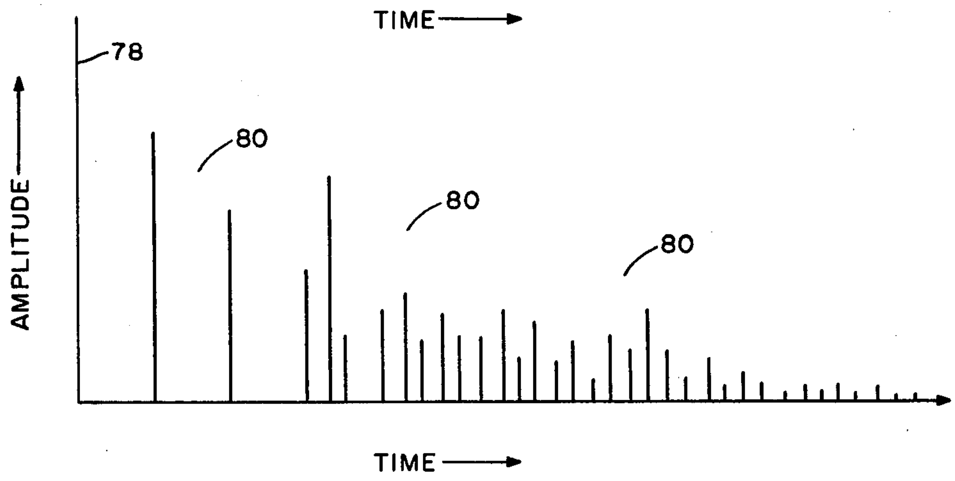

In response to a pulse input to mixer 48R in FIG. 1, reverberation unit 56R will produce a series of pulses, as shown in FIG. 3A, having a reverberation period of T. Each of these pulses, present at output 57R of unit 56R, will also be applied to the input to reverberation unit 56L through mixer 48L. In response to each of these pulses, reverberation unit 56L will produce a series of pulses as shown in FIG. 3B with these applied to reverberation unit 56R through mixer 48R, and each of these pulses will cause reverberation unit 56R to produce additional pulses characterized by FIG. 3A at its output. This process continues until the amplitudes of the pulses present at the outputs 57R and 57L decay to a negligible level. Because of the difference in reverberation periods between reverberation units 56R and 56L, an ever increasing number of echoes are produced at outputs 58R and 58L, with the echoes even more closely spaced in time than they would be in the case with a single reverberation unit having a single reverberation period. This is shown in FIG. 3C which corresponds to the signal produced at output 58R in response to a single pulse 78 applied to the circuit of FIG. 2. The output pulses 80 are more closely spaced in time than the output pulses of either reverberation unit 56R or 56L alone. This effect could be augmented by increasing the lowest common multiple of the periods, here being only 5. The reverberation times shown in FIGS. 3A and 3B were chosen primarily for purposes of illustration. In actual practice, the difference in reverberation times could be smaller than is shown in the figures, resulting in an even greater reduction in the time between discrete echoes than is shown in FIG. 3C. The amplitudes of the echoes shown in FIG. 3C do not uniformly decay with time, but instead are somewhat random in nature. As mentioned above, such a response more closely resembles the reverberation response of real rooms and accordingly results in a more realistic sound.

While the circuit is most easily explained using a single pulse as an input, in an actual application, complex signals are present at both the right and left stereo inputs. Each of these signals applied to the circuit of FIG. 1 produces a series of echoes at both right and left rear signal outputs 58L and 58R. These outputs simulate realistically the actual reverberation produced in a real room. The signals present at each of the outputs 58R and 58L initially are predominantly composed of the stereo input signal applied to the corresponding mixer. With time, each of the outputs contain a larger proportion of the opposite stereo input signal until the outputs become essentially identical. Again, this operation simulates the actual response of a real room. The first reverberations heard by the ear are very directional, but as time elapses, later reverberations are the result of sound waves which have echoed within the room in complicated patterns and which are much less directional in nature. It should be noted that because of this effect, the first echoes being highly directional and later echoes being less directional, the reverberation system of the invention will add to the realism of the reproduced sound even where the reverberation periods of the reverberation units is the same.

Thus, the reverberation system shown in FIG. 2 produces two signals which are suitable for use in driving right and left rear speakers in a quadraphonic sound system to achieve a realistic simulation of the reverberation found in an actual room with a relatively modest amount of circuitry. Furthermore, long reverberation times can be achieved without producing unrealistic discrete-echo effects, and without requiring a large number of reverberation units. In fact, only one reverberation unit per channel is required, which is a significant advantage and improvement over previous reverberation systems.

Figure 4:
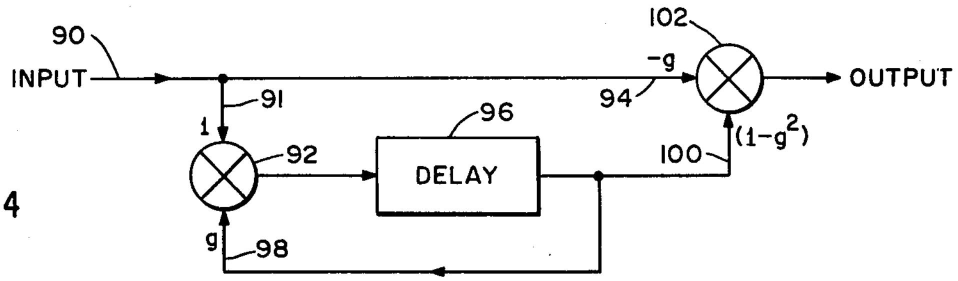
FIG. 4 shows an alternate reverberation unit suitable for use with the invention in a preferred embodiment.

With reference now to FIG. 4, there is shown a circuit which is particularly advantageous for use as a reverberation unit with the invention in order to avoid having a frequency response which is periodic with maxima and minima occurring at frequencies separated by the reciprocal of the reverberation period. In the circuit of FIG. 4, one of the stereo input signals is applied on a line 90 to a unity gain input 91 of a mixer 92. The output of mixer 92 is applied to a delay line 96 and the output of delay line 96 is fed back to a second input 98 of mixer 92 which has a gain of g which is less than one. The gain of delay line 96 is typically one. The mixer 92 and delay line 96 may be the same as the corresponding elements of the reverberation unit described and shown in FIG. 2. As mentioned above, for stable operation, the closed-loop gain should be less than one. The output of delay line unit 96 is applied to an input 100, at a gain of $(1-g^2)$, of a second mixer 102. The input signal on line 90 is also applied to mixer 102 at a further input 94 which has a gain of $-g$. The output 104 of mixer 102 forms the output signal of the reverberation unit. By thus combining the undelayed sound from input 90 and the delayed sound from mixer 92 and delay line 96 in the proportions shown, there results a uniform frequency response of the reverberator for all frequencies. The circuitry of FIG. 4 is described in greater detail in "Colorless Artificial Reverberation," M. R. Schroeder & B. F. Logan, *I.R.E. Transactions on Audio*, November/December 1961, pp. 209–214.

The response of the circuit of FIG. 4 is also exemplified by the diagram of FIG. 2A, and in use in the FIG. 1 circuitry, the system response is as shown in the diagram of FIGS. 3A, B and C. Accordingly, an input pulse produces a series of output pulses which decrease in amplitude with time and which are separated in time by a reverberation period equal to the delay time of delay line 96. The principal difference between the outputs of the circuits of FIG. 4 and FIG. 2 is in the phasing of the pulses produced by the circuit of FIG. 4.

Figure 5:
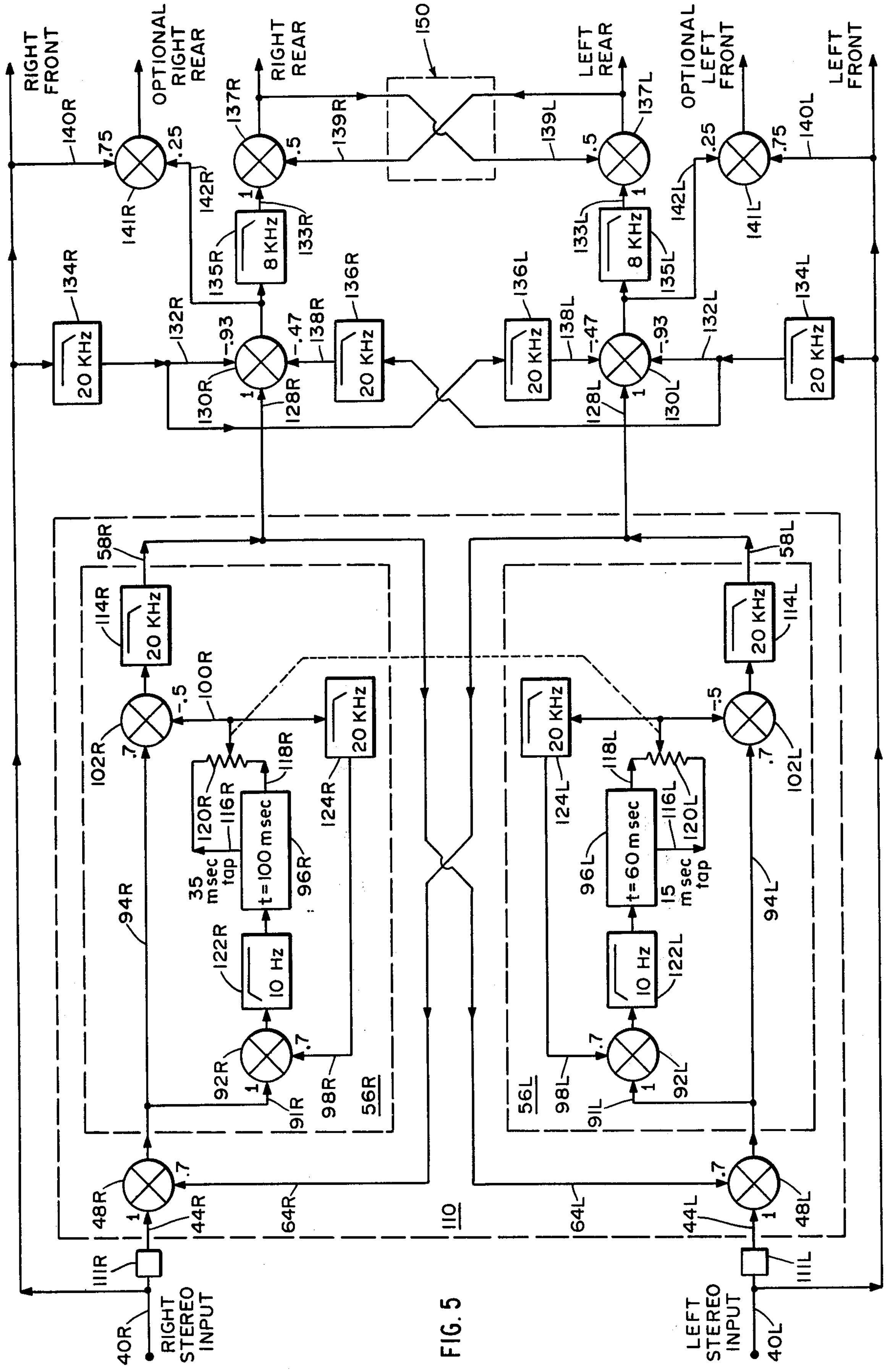
FIG. 5 is a detailed circuit diagram of a particular embodiment of the invention in FIG. 1 for use in producing quadraphonic signals from stereo input signals.

With reference now to FIG. 5, there is shown a block diagram of a further embodiment of the invention adapted for producing rear channel signals in a quadraphonic audio reproduction system from a two-channel stereo input with optional signal processing of the reverberating signals for the rear channels. The circuitry 110 enclosed within dashed lines presents one exemplary implementation of the block diagram shown in FIG. 1. As in FIG. 1, a right stereo signal is applied to a first unity gain input 44R of mixer 48L through optional bass boost circuit 111R, which provides a 6db bass boost to frequencies below 100 Hz. The output of mixer 48R is applied to reverberation unit 56R. The output from reverberation unit 56R is applied to the second input 64L, having a gain of 0.7, of mixer 48L. The left stereo input is applied to the first, unity gain input 44L of mixer 48L. The output of mixer 48L is applied to the input of reverberation unit 56L enclosed by dashed lines whose output is connected to second input 64R, having a gain of 0.7, of mixer 48R. Mixers 48R and 48L are typically summing amplifiers.

Reverberation units 56R and 56L are similar to the units shown in FIG. 4. The delay time of reverberation unit 56R is set at 100 milliseconds, while the delay time of reverberation unit 56L is set at 60 milliseconds. This provides the interspersed echo effect described above with reference to FIG. 3. In the implementation of the reverberation units 56R and 56L in FIG. 5, filters 114R and 114L, single pole filters having break frequencies of approximately 20 kHz, are provided at the outputs of the units 56R and 56L. These filters serve to attenuate the higher frequencies above the audible range of the signals circulating within circuit 110.

Within reverberation units 56R and 56L, the outputs from mixers 48R and 48L are applied to mixers 92R and 92L, respectively, at unity gain inputs 91R and 91L and to mixers 102R and 102L at respective inputs 94R and 92L, each having a gain of 0.7. The outputs of mixers 92R and 92L are applied through high-pass filters 122R and 122L to delay lines 96R and 96L, respectively. Filters 122R and 122L have break points at 10 Hz which help to eliminate the objectionable effect of recirculating subaudible signals in the reverberation closed loop. Delay line 96R has a first output 116R provided with a 35 millisecond delay, and a second output 118R provided from the end of the delay line with the full delay of 100 milliseconds. These signals are applied to either ends of a potentiometer 120R with an adjustable combination of them appearing at the wiper arm of the potentiometer 120R. By changing the setting of potentiometer 120R, the effective delay of the delay line can be varied from 35 milliseconds to the full 100 milliseconds, resulting in adjustable system delay to simulate the reverberation response of different sized rooms. Similarly, delay line 96L in the reverberation unit 56L has an output 116L with a 15 millisecond delay to provide a first output. This output is similarly combined with the full 60 millisecond delayed output 118L of line 96L by a potentiometer 120L to achieve the same effect as the wiper arm of the potentiometer 120L as in reverberation unit 56R. Potentiometers 120R and 120L are preferably ganged so that both are varied simultaneously.

Low-pass filters 124R and 124L in reverberation units 56R and 56L respond to the signals at the wiper arms of potentiometers 120R and 120L and apply filtered signals to second inputs 98R and 98L of mixers 92R and 92L, respectively, with gains of 0.7 each. These filters have break points at 20 kHz and attenuate high frequencies above the audible range of the echoes produced by the reverberation units 56R and 56L.

The outputs 58R and 58L, taken from the 20 kHz filters 114R and 114L, can be used as right rear and left rear speaker signals. However, it has been found that the realism of the sound produced when these signals are used to drive rear speakers can be increased by further processing as shown in FIG. 5. For this purpose, outputs 58R and 58L are applied to first unity gain inputs 128R and 128L, of mixers 130R and 130L. The right and left stereo inputs on lines 40R and 40L are applied to second inputs 132R and 132L, typically having gains of −0.93, of mixers 130R and 130L through 20 kHz low-pass filters 134R and 134L, respectively. The outputs of filters 134R and 134L are also cross-coupled to third inputs 138L and 138R of mixers 130L and 130R, respectively, in the opposite channels through further 20 kHz low-pass filters 136L and 136R, respectively. The gains of the third inputs 138R and 138L are typically −0.47. The outputs of mixers 130R and 130L are applied to first inputs 133R and 133L, having unity gain, of mixers 137R and 137L through 8 kHz low-pass filters 135R and 135L; and the outputs of these mixers 137R and 137L are cross-connected to second inputs 139L and 139R, having gains of 0.5, of the opposite mixers 134L and 134R, respectively. The right rear and left rear speaker signals are taken respectively from the outputs of mixers 137R and 137L.

As stated above, the right front and left front speaker signals normally are taken directly from the right and left stereo inputs. However, optional right front and left front speaker signals providing more realistic sound in some situations may be produced by combining front and rear speaker information. Exemplary circuitry for achieving this result is shown in FIG. 5. Mixers 141R and 141L combine the right and left stereo input signals on lines 40R and 40L as applied to first inputs 140R and 140L, having gains of 0.75, with the outputs of mixers 130R and 130L respectively as applied to second inputs 142R and 142L, having gains of 0.25, of mixers 138R and 138L. The outputs of mixers 141R and 141L can be used as optional right and left front speaker signals.

While the embodiment shown in FIG. 5 is deemed preferable, the specific circuitry and gain values shown are exemplary only. The reverberation units 56R and 56L shown in FIG. 5 can be other than as specifically shown there. For example, mechanical spring-type reverberation units may be used in implementing the structure of the invention.

In the embodiment of FIG. 5 shown above, it may be desired to increase the effective stereo separation of the signals available in the rear channels to enhance the realism of the reproduced sound.

Figure 6:
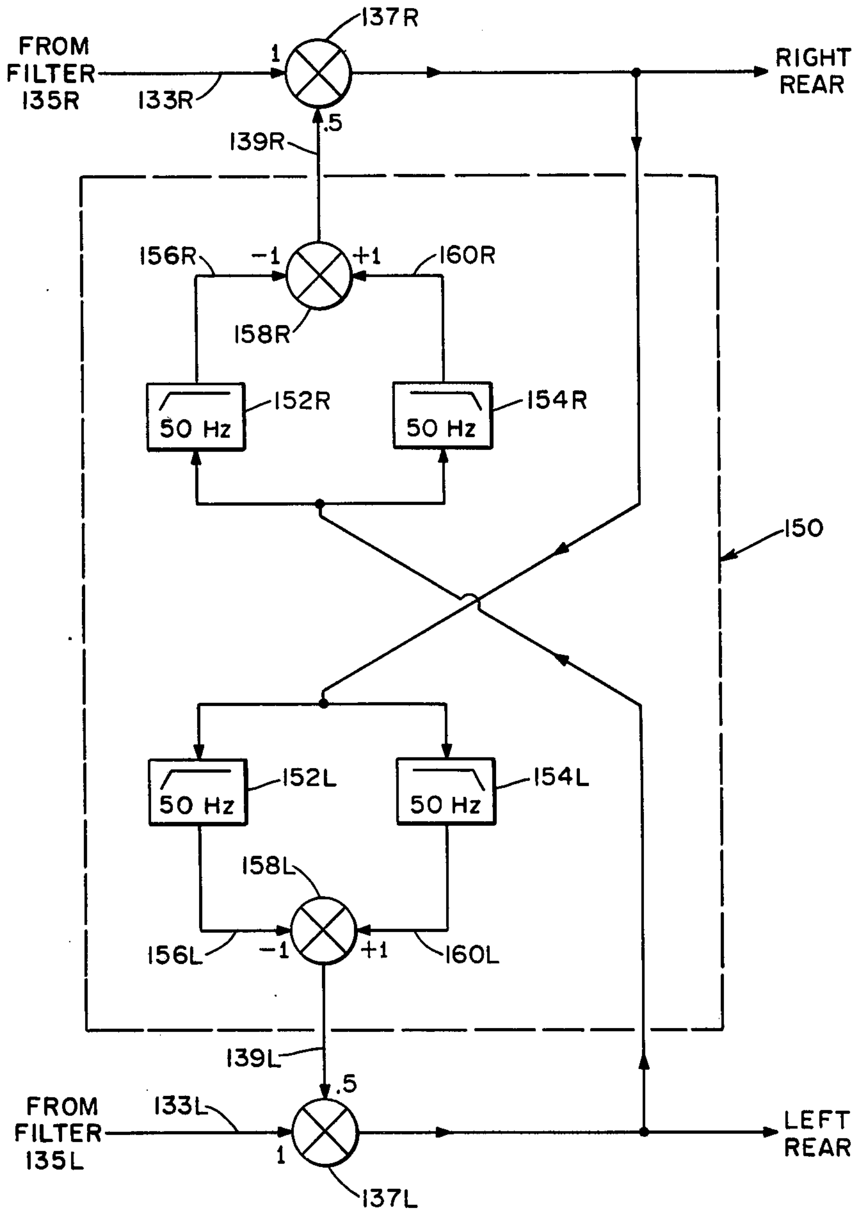
FIG. 6 shows optional circuitry for use in the FIG. 5 embodiment.

This further realism can be added to the signals produced by the circuitry of FIG. 5 by additional circuitry connected between the cross-coupled mixers 137R and 137L in place of the connections shown within a box 150. Referring to FIG. 6 wherein this circuitry is shown in greater detail with representative and not limiting values, the output from mixer 137R is applied to the inputs of filters 152L and 154L, which are respectively high-pass and low-pass filters each having typical break points at 50 Hz. The output of filter 152L is applied to an input 156L, having a gain of −1, of a mixer 158L; and the output of filter 154L is applied to input 160L, having a gain of +1, of the mixer 137L, in place of the direct connection from the output of mixer 137R to input 139L shown in FIG. 5. Similarly, the output of mixer 137L applied to a high-pass filter 152R and a low-pass filter 154R each having 50 Hz break points. The output from filter 152R is applied to an input 156R, having a gain of −1, of a mixer 158R; and the output from filter 154R is applied to an input 160R, having a gain of +1, of mixer 158R. The output of mixer 158R is applied to an input 139R of mixer 137R, in place of the direct connection from the output of mixer 137L to input 139R shown in FIG. 5.

In operation, the circuitry 150 of FIG. 6 causes higher frequency components of signals occurring at both the right-rear and left-rear outputs to appear with opposite phases, thus heightening the stereophonic effect produced by the two rear channel speakers. These signals pass from the outputs of mixers 137R and 137L through 50 Hz high-pass filters 152L and 152R to the inverting inputs 156L and 156R of mixers 158L and 158R and thence to inputs 139L and 139R of mixers 137L and 137R, causing the components from one rear output channel to be inverted in phase in their appearance at the other rear output channel. Due to the long wavelengths of low frequency audio signals, the aforementioned phase inversion, if applied to low frequency signals, would cause these signals to cancel in part, or in whole, thus effectively reducing the amplitude of these low-frequency signals. Accordingly, the low frequency components of the outputs from mixers 137R and 137L do not pass through high-pass filters 152R and 152L but instead through the 50 Hz low-pass filters 154L and 154R to the noninverting inputs 160L and 160R of mixers 158L and 158R. Thus, the low frequency components of each of the rear channel speakers which are cross-coupled into the opposite channel by the operation of mixers 137R and 137L appear in-phase with each other on the two rear channel outputs, thereby avoid the phase cancellation effect mentioned above.

It should be appreciated that the circuitry shown in FIG. 6, although particularly useful and applicable to the reverberation system of FIG. 5, can be applied to other stereophonic and quadraphonic sound systems in which it is desired to partially or wholly mix two input signals to provide two output signals, while still preserving the stereophonic separation between the two output signals by inverting the phases of the cross-coupled components and without causing a decrease in the base amplitude due to cancellation of opposite-phase, low-frequency signals.

Various modifications and alternate implementations which do not depart from the true scope of the invention will be apparent to those versed in the art. Accordingly, it is not intended to limit the invention by what has been particularly shown and described, except as indicated in the appended claims.

We claim:

1. A system for simulating reverberation acoustics in an audio signal having first and second system input signals, said system comprising:

at least first and second reverberation means, each including:

a delay line having:

means for providing a first delay in the input signal;

means for providing a second delay in the input signal, which second delay is larger than the first delay; and means for combining the delay line input signal delayed by the first delay with the delay line input signal delayed by the second delay in a variable proportion to provide a delay line output, so that the effective delay of the delay line output can be varied;

a first reverberation mixer having first and second inputs with gains of 1.0 and 0.7, respectively, and having the signal applied as input to the reverberation means applied to the reverberation mixer first input;

a high-pass filter having a break point frequency of approximately 10 Hz and responsive on its input to the output of the first reverberation mixer to provide a high-pass filtered output which is applied to the input of the delay line;

a low-pass filter having a breaking point frequency of 20 kHz and responsive on its input to the delay line output to provide a low-pass filtered output which is applied to the second input of the first reverberation mixer;

a second reverberation mixer combining the signal applied to the reverberation means input with the delay line output with gains of 0.7 and −0.5, respectively; and a low-pass filter having a break point frequency of 20 kHz, and responsive on its input to the output of the second reverberation mixer to provide a low-pass filtered output which defines the output of the reverberation means;

the first delay of the delay line in the first reverberation means being approximately 35 milliseconds, and the second delay thereof being approximately 100 milliseconds;

the first delay of the delay line in the second reverberation means being approximately 15 milliseconds and the second delay thereof being aproximately 60 milliseconds;

means for mixing the output of said first reverberation means with the second system input signal to provide an output which is applied to the input of said second reverberation means;

means for mixing the output of said second reverberation means with the first system input signal to provide an output which is applied to the input of said first reverberation means, thereby to provide recirculation of signals through said first and second reverberation means in a closed loop;

there being a less than unity gain for the loop gain of said closed loop;

first and second low-pass output filters, each having break point frequencies of approximately 20 kHz, and receiving on respective inputs the first and second system input signals to provide respective filtered outputs;

third and fourth low-pass output filters, each having break point frequencies of approximately 20 kHz and receiving on respective inputs the outputs of the second and first low-pass output filters to provide respective filtered outputs;

the first output mixer combining the outputs of the first low-pass output filter, the output of the first reverberation means, and the output of the third low-pass output filter to provide an output representing the combination;

a second output mixer combining the output of the second low-pass output filter, the output of the second reverberation means, the output of the fourth low-pass output filter to provide an output representing the combination;

fifth and sixth low-pass output filters receiving on inputs thereof respectively the outputs of the first and second output mixers to provide respective outputs;

first and second phasing means, each having an input and an output and providing respective outputs in which frequency componenets of the input signal applied thereto higher than a selected frequency are inverted in phase with respect to frequency components lower than the selected frequency; and a third output mixer combining the output of the fifth output filter and the output of the first phasing means to provide an output applied to the second phasing means;

a fourth output mixer combining the output of the sixth output filter and the output of the second phasing means to provide an output applied to the first phasing means;

the outputs of the third and fourth output mixers providing first and second system output signals.

2. The system of claim 1 further comprising:

a fifth output mixer combining the first system input signal and the output of the first output mixer to provide an output representing the combination;

a sixth output mixer combining the second system input signal and the output of the second output mixer to provide an output representing the combination;

the outputs of the fifth and sixth output mixers defining third and fourth system output signals.

* * * * *